Dec. 19, 1950  A. J. BERGER  2,534,218
SHOCK TESTING DEVICE
Filed June 23, 1945
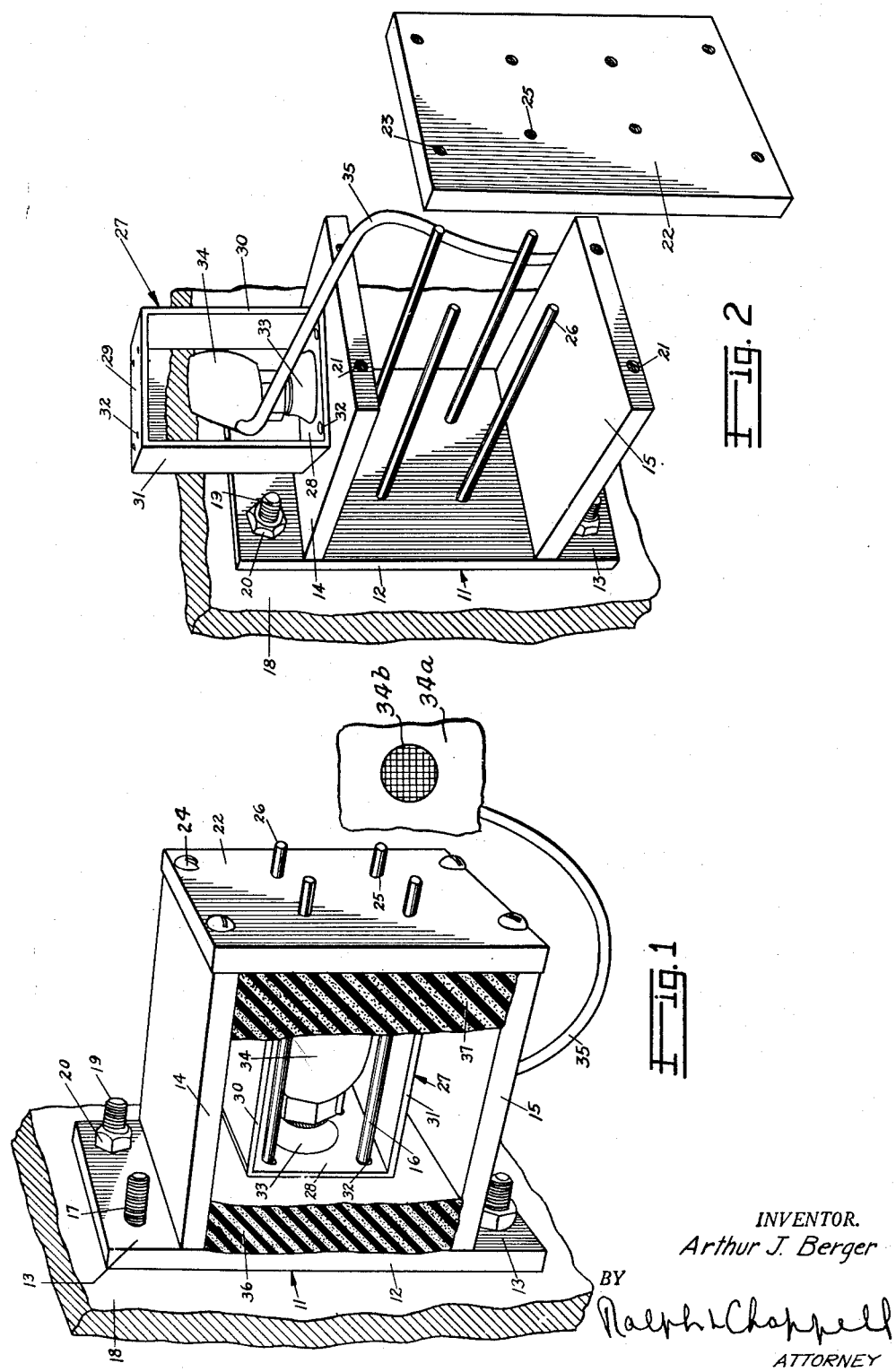
INVENTOR.
Arthur J. Berger
BY
Ralph L Chappell
ATTORNEY Patented Dec. 19, 1950

2,534,218

UNITED STATES PATENT OFFICE 2,534,218

SHOCK TESTING DEVICE

Arthur J. Berger, New York, N. Y.

Application June 23, 1945, Serial No. 601,283

3 Claims. (Cl. 73—12)

(Granted under the act of March 3, 1883, as amended April 30, 1928; 370 O. G. 757)

The present invention concerns a fixture for use on a shock testing machine, and particularly concerns a fixture for use in a machine designed for testing the shock absorbing qualities of sponge materials such as foam rubber and foam plastics.

In testing the shock absorbing qualities of materials by conventional methods and apparatus, it has been found difficult to obtain consistent results upon repeated tests due to erratic oscillations and accelerations that are set up in the apparatus during the tests. These result in irregular findings, thereby making it difficult to repeat similar results upon specimens of the same material. Thus there is a wide spread or range of measurements obtained with the same sponge materials.

The present invention enables reproducible results to be obtained by providing a fixture in which a cage containing a quartz crystal accelerometer is mounted for freely sliding movement upon guide rods that are mounted rigidly in parallel relation in the frame. The guide rods can be arranged to permit sliding movement of the cage in any direction desired and preferably, the guide rods are mounted parallel to the line of shock to be delivered to the fixture. By this arrangement the cage is confined to oscillation along a single line and only acceleration along this line will be recorded. Thus erratic oscillations and accelerations are substantially eliminated.

An object of this invention is to provide a fixture for use with a shock machine in testing the shock absorbing qualities of sponge material.

A further object is to provide a fixture having a frame and a cage mounted to slide on guide rods within the frame and cushioned from the frame by the material to be tested.

A further object is to provide a fixture having a frame for delivering shock through the material to be tested to a recording cage in combination with means for limiting oscillation of the cage to a line parallel to the line of shock.

Further objects and advantages of this invention, as well as its construction, arrangement and operation, will be apparent from the following description and claims in connection with the accompanying drawing, in which Fig. 1 is a perspective view showing a preferred embodiment of the invention with test specimens loaded therein; and Fig. 2 is an exploded perspective view of the construction shown in Fig. 1 with the cage removed and disposed in random position on top of the frame.

The present invention includes a frame 11 having an end plate 12, provided with anchoring portions 13, a top plate 14 and a bottom plate 15. Top plate 14 and bottom plate 15 can be secured rigidly to end plate 12 in any suitable manner as, example, by welding. Guide rods 16 are secured rigidly to end plate 12 and extend centrally within frame 11 in parallel relation with top plate 14 and bottom plate 15. Anchor portions 13 of end plate 12 are provided with openings 17 by means of which frame 11 can be secured to a support 18 by means of bolts 19 and nuts 20. The ends of top plate 14 and bottom plate 15, remote from end plate 12, are provided with threaded openings 21.

A detachable end plate 22 provided with openings 23 is adapted to be secured removably to top plate 14 and bottom plate 15 by means of screws 24 which extend through openings 23 and are threaded into openings 21. Detachable end plate 22 is provided with centrally located openings 25 through which extremities 26 of guide rods 16 are adapted to extend when end plate 22 is secured to top plate 14 and bottom plate 15.

Adapted for disposition within frame 11 is a cage 27 formed of end plates 28 and 29, top plate 30 and bottom plate 31. Plates 28, 29, 30 and 31 can be secured rigidly together in any suitable manner, as, for example, by welding. End plates 28 and 29 are provided with openings 32 by means of which cage 27 can be mounted upon guide rods 16 for sliding movement. Provided centrally on end plate 28 is a boss 33 which is threaded to receive a quartz crystal acceleration responsive device 34 of conventional type. Such device is responsive to acceleration of cage 27. Acceleration responsive device 34 can be connected by a cable 35 to a conventional cathode ray oscillograph shown diagrammatically at 34a and provided with an indicating grid screen 34b for indicating the accelerations registered by acceleration responsive device 34 and for making a permanent photographic record thereof if so desired in conventional manner.

A sample of material 36 that is to be tested is inserted between end plate 28 of cage 27 and end plate 12 of frame 11. A companion sample of material 37 that is to be tested is inserted between end plate 29 of cage 27 and detachable end plate 22 of frame 11. The thickness of specimens 36 and 37 is such that cage 27 is cushioned snugly from frame 11. It will be appreciated that specimens 36 and 37 are relatively thin and if they do not completely fill the space between the ends of cage 27 and the ends of frame 11, suitable shim or filler blocks (not shown) can be inserted adjacent end plates 12 and 22 of frame 11 to fill the excess space.

The operation of the device is as follows: To condition the fixture for performing a test, frame 11 is mounted upon support 18 by means of bolts 19 and nuts 20. Detachable end plate 22 is removed by withdrawing screws 24 and cage 27 is also removed. Specimen 36 of the material to be tested is then inserted within frame 11 against end plate 12 over guide rods 16. Cage 27 is then mounted upon guide rods 16 and reciprocated into frame 11 against specimen 36. Companion specimen 37 is then inserted into frame 11 against end 29 of cage 27, and detachable plate 22 is fitted over extremities 23 of guide rod 16 and secured in place by means of screws 24. Cable 35 from acceleration responsive device 34 is then connected to a suitable cathode ray oscillograph 34a.

The test is performed by delivering shock from support 18 to frame 11 along a line perpendicular to end plate 12. Shock is transmitted by end plate 12 through specimen 36 to cage 27. As a result of the shock, cage 27 will be accelerated and caused to move toward detachable end plate 22 of the frame, where the cushioning action of specimen 37 will decelerate the cage and then accelerate its movement back toward end plate 12. Repetition of this acceleration and deceleration causes the cage to oscillate within the cushion afforded by specimens 36 and 37. Quartz crystal acceleration responsive device 34, as a result of the oscillating movement of cage 27, will have fluctuating voltages introduced upon its crystal face and such voltages will be transmitted through cable 35 to the oscillograph 34a, where a record of the cathode ray pattern produced by the oscillograph can be made.

Since cage 27 is mounted for sliding movement upon guide rods 16, oscillating movement of the cage under the influence of shock will be confined to a path parallel to the line of direction of the shock and any tendency of cage 27 to wobble or oscillate in other directions is eliminated.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A device for testing the shock absorbing characteristics of material, said device comprising a rigid frame, guiding means within said frame, and an acceleration responsive device mounted slidably for oscillation on said guiding means within said frame, said acceleration responsive device at its opposite ends defining a pair of spaces relative to the internal walls of said frame for accommodating a pair of specimens of material to be tested, whereby shock transmitted to said frame opposite an end of said acceleration responsive device is transmitted through the material to be tested to effect oscillation of said acceleration responsive device between the pair of specimens.

2. A relatively light weight, portable device for making precision measurements of the shock absorbing qualities of material, said device comprising a rigid, box-shaped frame adapted to receive shock from an external source along a predetermined line of delivery and having an anchor plate perpendicular to said line of delivery; guide rods extending from said anchor plate through said frame parallel to said line of delivery; and an acceleration responsive device mounted slidably for oscillation on said guide rods; said acceleration responsive device at its opposite ends defining a pair of spaces relative to the internal walls of said frame for accommodating a pair of specimens of material to be tested, whereby shock transmitted to said frame is transmitted through the material to be tested to effect oscillation of said acceleration responsive device between the pair of specimens.

3. A relatively light weight, portable device for making precision measurements of the shock absorbing qualities of sponge material comprising a rigid, box-shaped frame adapted to receive shock from an external source along a predetermined horizontal line of delivery and having an anchor plate perpendicular to said line of delivery, a pair of spaced, parallel, horizontally disposed plates integral with said anchor plate; a detachable, vertical end plate mounted across the free ends of said horizontal plates in spaced relation from said anchor plate; horizontal guide rods extending from said anchor plate to said detachable end plate; a quartz crystal acceleration responsive device mounted slidably on said rods within said frame for oscillation along a horizontal path parallel to said line of delivery, said acceleration responsive device when centrally disposed on said rods defining a space between said anchor plate and one end of said acceleration responsive device for accommodating a specimen of material to be tested and defining a second space between said detachable end plate and the other end of said acceleration responsive device for accommodating a second specimen of material to be tested, whereby shock delivered externally to said anchor plate is transmitted through the specimen of material adjacent thereto to effect oscillation of said acceleration responsive device along a horizontal path between said specimens of material to be tested, and means for indicating the pattern of oscillation of said acceleration responsive device.

ARTHUR J. BERGER.

REFERENCES CITED

The following references are of record in the file of this patent:

UNITED STATES PATENTS

| Number | Name | Date |
| --- | --- | --- |
| 1,255,919 | O'Connor | Feb. 12, 1918 |
| 1,921,624 | Lewis | Aug. 8, 1933 |
| 2,163,847 | Perrey | June 27, 1939 |

FOREIGN PATENTS

| Number | Country | Date |
| --- | --- | --- |
| 315,392 | Great Britain | Aug. 25, 1930 |